Feb. 18, 1930.    A. GUDMUNDSEN ET AL    1,747,625

BEET CLEANER

Filed May 16, 1927

Abraham Gudmundsen
Austen Gudmundsen
INVENTORS

Patented Feb. 18, 1930

1,747,625

UNITED STATES PATENT OFFICE

ABRAHAM GUDMUNDSEN, OF AMERICAN FORK, AND AUSTIN GUDMUNDSEN, OF SALT LAKE CITY, UTAH

BEET CLEANER

Application filed May 16, 1927. Serial No. 191,783.

The invention pertains to machines for cleaning beets or the like, and has for its particular object the reclamation of small particles and ends of sugar beets called "tailings" that accumulate at various places in a beet sugar mill. These "tailings" are contaminated with rocks, bits of wood, roots, sand, iron, and large quantities of beet leaves. It is the object of this invention to separate the small beets and pieces of beets from this refuse.

Figures 1, 2:
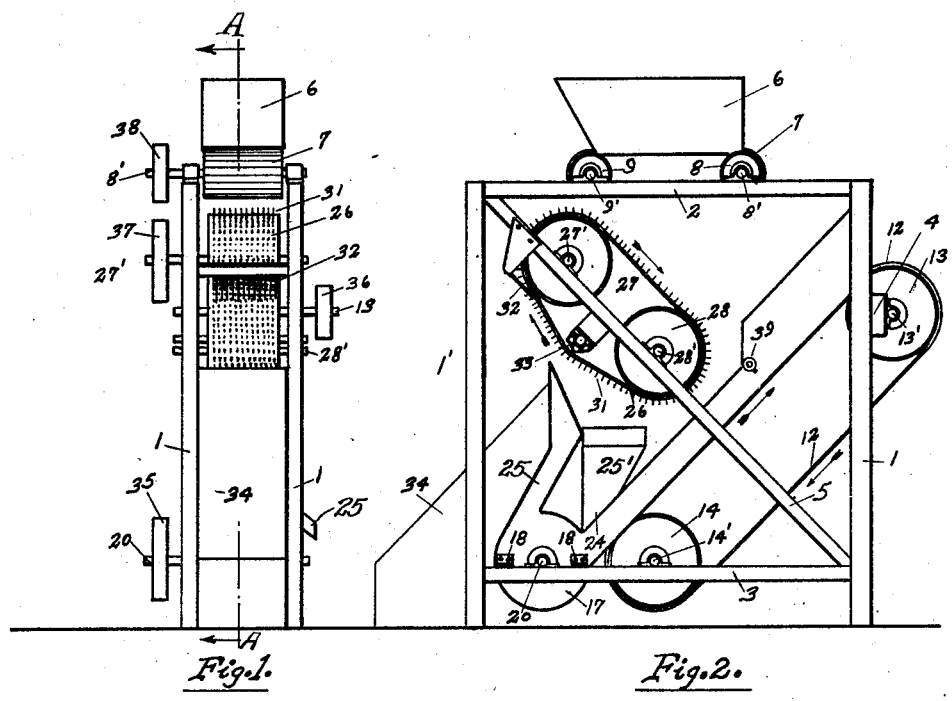
Figure 3:
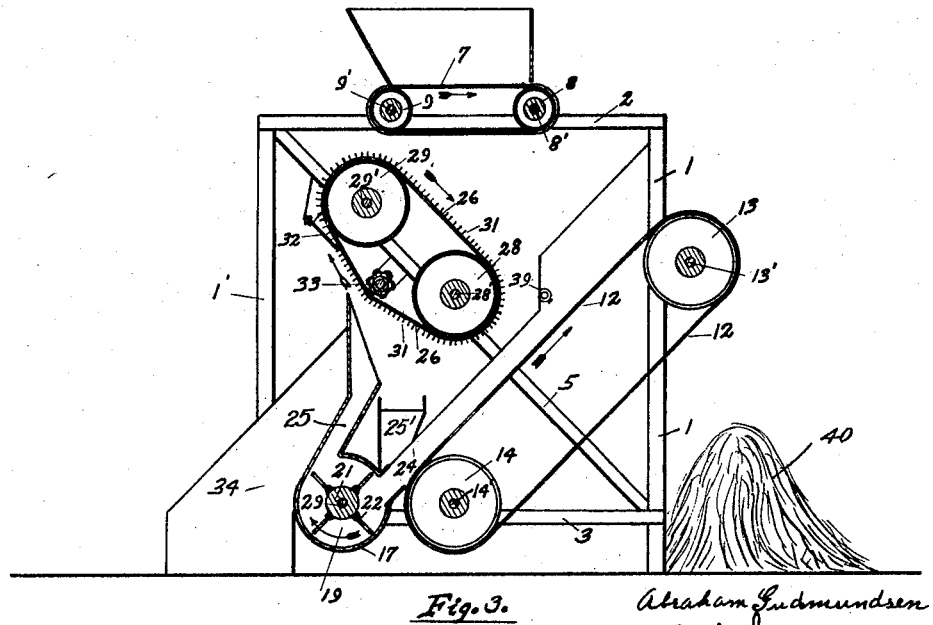

The invention is illustrated in the accompanying drawing, wherein:—Fig. 1 is an end elevation of the machine, Fig. 2, a side elevation and Fig. 3, a sectional elevation thru A—A— of Fig. 1.

In carrying out the invention, there is provided a supporting frame including legs 1 and 1' at either end, a pair of longitudinal beams 2 at the top, a pair of longitudinal beams 3 near the bottom, and a pair of longitudinal sloping beams 5. Supported from the top beams 2 is a feeder comprising a hopper 6 disposed above an apron conveyor 7, trained over pulleys 8 and 9, and the shafts 8' and 9' are journaled as shown. Under the feeder is a longitudinal sloping belt conveyor 12 trained over pulleys 13 and 14, the supporting shafts 13' and 14' of which are journaled as shown. Adjacent to the bottom pulley 14 is a housing 17 secured thru brackets 18 to beams 3. Inside of the housing is a rotating impeller 19, comprising a shaft 20 which is journaled in bearings 23, a hub 21, and radial hinged blades 22 flexibly secured to hub 21. The housing 17 has an inlet opening 24 and a discharge spout 25. Immediately above the discharge spout 25 is a belt 26 trained over pulleys 27 and 28, the supporting shafts 27' and 28' of which are journaled as shown. Belt 26 carries projecting pins, or spines, 31 which are spaced apart a small distance from each other to secure, in effect, a mat of spines. Disposed between rows of spines 27 are rods, or fingers, 32 which are at an angle with the lower run of the belt 26. These rods act as strippers to detach impaled objects from the spines allowing them to drop into a hopper 34. Acting on the top side of the lower run of belt 26, and located about midway between pulleys 27 and 28 is an idler 33 that carries the belt 26 thru a slight angle. The purpose of this will be borne out in later discussions.

The impeller 19 is driven thru any suitable train or mechanism, a pulley 35 secured to shaft 20 being here shown. Likewise the inclined belt 12, the belt 26 and the feeder may be driven thru pulleys 26, 37 and 38 respectively, the direction of rotation, or drive, being shown by arrows. A spray pipe 39 is provided adjacent to the belt 12 so that water or other suitable liquid may be sprayed thereon when desired.

In operation, trash contaminated "tailings" are placed in the hopper 6. The conveyor 7 feeds the material in a fine stream onto the belt 12 which is kept wet from the spray 39. The particles of beets, rocks, sand, and some of the wood, having attained considerable velocity in falling, bounce when they strike the belt 12 and go sliding and bouncing to the bottom. The leaves, mud, flat pieces of wood, etc. do not bounce appreciably when they strike the wet belt 12, but adhere to it, and are carried up to the top and over the pulley 14, where they fall into the trash heap 40. The particles of beet etc., that go to the bottom of the belt 12 are thus fed into the impeller 19 in a continuous stream. The blades 22 carry these particles around in the direction indicated, impart to them a considerable velocity, and direct them thru the spout 25 onto the spines 31 which are carried on the belt 26. The beets, being soft, are impaled on the spines 31 and are carried on with the belt. Hard objects such as rocks, etc., are not impaled but fall from the spines onto the chute 25' which directs such discarded material to one side of the impeller housing and onto the floor. If, however, a hard object such as a rock should occasionally become wedged between the spines, it may be carried along with the beets. To eliminate these wedged in particles, the idler 33 is provided. It will be noted that the belt 26, as it passes over the idler 33, is bent to cause the spines to project radically from the idler axis as a center. This causes the spines to be spread apart at their tips, thus allowing wedged in particles to be released. To facilitate the release of these hard objects the idler 33 is made with a corrugated surface which causes the belt to vibrate thus shaking the hard particles from between the now spreading spines before the strippers 32 are reached which allows them to drop back down the discharge spout 25 and into the impeller 19 again. The beets are carried up to the fingers or strippers, 33 where, due to the wedging off action of these rods, they are released and fall from the spines into a chute or hopper 34.

It is thus possible to continuously feed into the machine trash contaminated "tailings" and make a clean separation of beets from trash, thus enabling these beets to be delivered to the cutting machine along with the main supply of beets, free from any trash that might dull or clog the cutters.

While the present machine is particularly adapted to the above use, it may be used for cleaning or separating other articles as well. It is understood that changes may be made in the precise embodiment of the invention described herein without departing from the spirit thereof.

We claim:

1. A separator comprising a feeder, an inclined endless belt conveyor disposed adjacent to and below the feeder said inclined conveyor being adapted to cause certain of the objects dropped thereon to adhere thereto and other objects to slide or bounce therefrom, a fan-like impelling member rotating within a housing disposed adjacent to the bottom of the inclined conveyor adapted to receive objects not retained on the conveyor, an endless belt disposed adjacent to said impeller having pins secured thereto and projectionable beyond the same to enter objects thrown against them, an idler disposed adjacent to the top side of the lower run of said pin carrying belt adapted to bend the belt thru an angle and to vibrate it, and means adjacent to the underside of the belt between rows of pins adapted to release objects from the pins.

2. A separator comprising a feeder, an inclined endless belt conveyor disposed below the feeder adapted to intercept falling objects discharged from the feeder, an impelling member disposed adjacent to the lower end of the inclined, endless belt conveyor adapted to receive objects discharged from the lower end of the endless belt conveyor, an endless member disposed adjacent to, and above, the impelling member adapted to intercept objects thrown from the impelling member, pins carried by the endless member and projectionable beyond the same to enter objects thrown against them and to carry the objects therewith, and means for releasing said objects from the pins.

3. A separator comprising a feeder, an endless belt trained over an upper pulley and a lower laterally disposed pulley to comprise an inclined belt conveyor disposed below the feeder adapted to intercept objects as they fall from the feeder discharge, spray means for wetting the endless belt surface, an impeller adjacent to the lower laterally disposed pulley of the inclined endless belt train adapted to receive objects discharged from the lower end of the inclined belt said impeller comprising a housing with an inlet opening and a discharge opening and a fan-like rotating member within the housing, an endless belt disposed adjacent to the discharge opening of said impeller, projecting pins carried on the endless belt adapted to enter objects thrown against them from the impeller, an idler adjacent to the top side of the lower run of said pin carrying belt adapted to bend the belt, and means adjacent to the pin carrying belt adapted to release objects from the pins.

4. A separator comprising a feeder, an endless belt conveyor disposed beneath the feeder the top longitudinal run of the conveyor being inclined at a considerable angle with the horizontal and having a direction of travel forward and upward, spray means disposed adjacent to the inclined belt adapted to wet the belt surface, an impeller housing disposed adjacent to the bottom pulley of said inclined belt said housing having a discharge opening and an inlet opening, said inlet opening being adapted to receive objects discharged from the adjacent end of said inclined conveyor, a rotating impeller member within the housing said impeller comprising a shaft and a plurality of blades flexibly secured thereto, and endless belt member disposed adjacent to the impeller housing discharge opening and carrying projecting pins to impale objects thrown on them by said impeller, an idler disposed adjacent to the top side of the lower run of the pin carrying belt said idler having an irregular or corrugated surface, and means adjacent to the underside of the pin carrying belt between rows of pins for releasing objects from the pins.

5. A separator for removing trash from sugar beets in two distinct operations, the first operation effecting separation of leafy and like material by mechanism comprising a wetted, inclined, forward and upwardly traveling endless belt surface onto which is sprinkled the objects to be separated, said sprinkling means being disposed relative to the inclined belt surface so as to cause said objects to impinge on the wetted, inclined surface with considerable velocity in such manner as to cause regular-shaped compact particles, as beets, rocks and like, to bounce and slide down the inclined surface while other less compact and irregular shaped particles such as leaves and the like adhere thereto, and a second operation effecting separation of hard material such as rocks, wood and the like, from beets by mechanism comprising an impeller housing disposed adjacent to the bottom end of the inclined belt to receive objects not retained on the belt surface, a rotating impeller member within the housing said impeller comprising a shaft and a plurality of substantially flat rectangular blades flexibly secured thereto, a pin carrying endless belt disposed adjacent to the impeller adapted to intercept objects directed against it by the impeller and to impale thereon soft objects such as beets, an idler member disposed against the back side of the lower run of said pin carrying belt adapted to bend and to vibrate it, and wedging means adjacent to and between rows of pins for removing objects impaled thereon.

In testimony that we claim the foregoing as our own, we have hereto affixed our signatures.

ABRAHAM GUDMUNDSEN.
AUSTIN GUDMUNDSEN.